US012774090B2

(12) United States Patent
Diaz et al.

(10) Patent No.: US 12,774,090 B2
(45) Date of Patent: Oct. 27, 2026

(54) BARRIER SYSTEM AND METHOD FOR A CARGO COMPARTMENT OF AN AIRCRAFT

(71) Applicant: THE BOEING COMPANY, Arlington, VA (US)

(72) Inventors: Derek Tyler Diaz, Lynnwood, WA (US); Samuel Howard Yadon, Arlington, WA (US); Andrew Peter Monary, Everett, WA (US); Kevin Clayton Crowe, Everett, WA (US); Colin Rotvold, Duvall, WA (US); Patrick Malkinson, Lynnwood, WA (US); Randall Fraker, Everett, WA (US)

(73) Assignee: The Boeing Company, Arlington, VA (US)

( * ) Notice: Subject to any disclaimer, the term of this patent is extended or adjusted under 35 U.S.C. 154(b) by 252 days.

(21) Appl. No.: 18/621,398

(22) Filed: Mar. 29, 2024

(65) Prior Publication Data

US 2025/0042573 A1 Feb. 6, 2025

Related U.S. Application Data

(60) Provisional application No. 63/517,406, filed on Aug. 3, 2023.

(51) Int. Cl.
*B64D 9/00* (2006.01)
*B64D 45/00* (2006.01)

(52) U.S. Cl.
CPC .......... *B64D 9/00* (2013.01); *B64D 2045/009* (2013.01)

(58) Field of Classification Search
CPC ..... E06B 9/66; E06B 9/64; E06B 9/40; B60P 3/205; B60P 7/00; B60P 7/04; B60P 7/08; B60P 7/087; B60P 7/0815; B64D 11/0023; B64D 9/00; B65D 90/0066; B64C 1/1469; B64C 1/1415; A47H 5/14;
(Continued)

(56) References Cited

U.S. PATENT DOCUMENTS

| | | | | |
|---|---|---|---|---|
| 89,126 A * | 4/1869 | Cheney | E06B 9/64 | 160/243 |
| 110,939 A * | 1/1871 | Tambling | E06B 9/64 | 160/243 |

(Continued)

FOREIGN PATENT DOCUMENTS

| | | | |
|---|---|---|---|
| EP | 4197903 | 6/2023 | |
| WO | WO 2022/046107 | 3/2022 | |
| WO | WO-2023021061 A1 * | 2/2023 | B64D 11/0023 |

OTHER PUBLICATIONS

Extended European Search Report for EP 24185839.8-1004, dated Oct. 15, 2024.

*Primary Examiner* — Johnnie A. Shablack
(74) *Attorney, Agent, or Firm* — Joseph M. Butscher; Carroll, Hoette & Butscher, LLC

(57) ABSTRACT

A vehicle includes an internal cabin having a main deck cargo compartment, and a barrier system within the internal cabin. The barrier system includes one or more flexible drapes moveable between an open position and a closed position. The barrier system is configured to selectively open and close the main deck cargo compartment from one more other areas of the internal cabin, and/or selectively open and close the main deck cargo compartment into separate areas.

20 Claims, 10 Drawing Sheets

(58) Field of Classification Search
CPC ............ A47H 2201/00; A47H 2201/01; A47H 2201/02; E05D 15/0656; E05D 15/0691
See application file for complete search history.

(56) References Cited

U.S. PATENT DOCUMENTS

| | | | | | |
|---|---|---|---|---|---|
| 524,712 | A * | 8/1894 | Gaudin | E06B 9/40 | 160/241 |
| 626,475 | A * | 6/1899 | Andrews | E06B 9/64 | 160/264 |
| 1,181,120 | A * | 5/1916 | Douthitt | E06B 9/64 | 160/243 |
| 1,925,815 | A * | 9/1933 | Mclean | E04H 6/02 | 160/245 |
| 2,522,509 | A * | 9/1950 | Fridolph | A47H 23/01 | 16/93 R |
| 2,605,064 | A * | 7/1952 | Davis | B64D 9/00 | 410/104 |
| 2,710,731 | A * | 6/1955 | Bright | B64D 11/0023 | 244/118.6 |
| 2,736,373 | A * | 2/1956 | Truesdale | A47H 5/032 | 160/124 |
| 2,949,841 | A * | 8/1960 | Richardson | B64D 13/02 | 454/76 |
| 3,090,426 | A * | 5/1963 | Carlo | E06B 9/08 | 160/180 |
| 3,331,426 | A * | 7/1967 | Ensign | E06B 3/928 | 160/199 |
| 3,376,599 | A * | 4/1968 | Singer | B60P 3/205 | 160/183 |
| 3,638,450 | A * | 2/1972 | Falk | B60P 3/205 | 160/368.1 |
| 4,046,186 | A * | 9/1977 | Nordstrom | B60P 7/04 | 160/368.1 |
| 4,049,311 | A * | 9/1977 | Dietrich | B60P 7/14 | 410/139 |
| 4,073,452 | A * | 2/1978 | Gosau | B64C 1/14 | 244/129.4 |
| 4,096,807 | A * | 6/1978 | Woodward | B60P 7/14 | 279/22 |
| 4,185,799 | A * | 1/1980 | Richards, Jr. | B64D 11/0023 | 410/105 |
| 4,298,048 | A * | 11/1981 | Roller | E06B 9/64 | 160/310 |
| 4,597,549 | A * | 7/1986 | Ryan | B64C 1/10 | 244/129.5 |
| 4,780,034 | A * | 10/1988 | Skotte | B60P 7/16 | 410/129 |
| 4,899,962 | A * | 2/1990 | Mueller | B64D 11/0023 | 52/2.21 |
| 4,943,110 | A * | 7/1990 | Pastva | B60J 5/065 | 49/411 |
| 5,069,401 | A * | 12/1991 | Shepherd | B64D 25/00 | 454/71 |
| 5,085,382 | A * | 2/1992 | Finkenbeiner | B64D 9/00 | 188/371 |
| 5,111,867 | A * | 5/1992 | Horton | B60J 5/065 | 16/87.6 R |
| 5,215,349 | A * | 6/1993 | Horton | B60J 5/065 | 296/186.2 |
| 5,421,539 | A * | 6/1995 | Carducci | B64D 9/00 | 244/118.1 |
| 5,658,037 | A * | 8/1997 | Evans | B60J 5/067 | 160/311 |
| 5,816,534 | A * | 10/1998 | Schumacher | B64D 11/0023 | 244/119 |
| 6,010,286 | A * | 1/2000 | Cross | B64D 9/00 | 410/127 |
| 6,189,831 | B1 * | 2/2001 | Asai | B64D 11/0023 | 454/76 |
| 6,435,786 | B1 * | 8/2002 | Breckel | B64D 9/00 | 410/97 |
| 6,598,651 | B2 * | 7/2003 | Ehrenberger | B60R 21/06 | 160/265 |
| 6,722,416 | B2 * | 4/2004 | Varley | E06B 9/70 | 160/264 |
| 6,751,969 | B1 * | 6/2004 | Moran | B82Y 30/00 | 62/177 |
| 6,923,610 | B2 * | 8/2005 | Nelson | B60P 3/205 | 410/140 |
| 7,530,529 | B2 * | 5/2009 | Bock | B64D 11/0023 | 244/118.6 |
| 7,735,539 | B2 * | 6/2010 | Nakamura | E06B 9/42 | 169/48 |
| 8,123,165 | B2 * | 2/2012 | Breuer | B60P 3/36 | 52/29 |
| 8,393,055 | B2 * | 3/2013 | Gower | E04H 9/14 | 16/95 D |
| 8,550,143 | B2 * | 10/2013 | Breuer | B64D 11/0023 | 160/127 |
| 8,684,308 | B2 * | 4/2014 | Warner | B64D 11/0023 | 244/118.5 |
| 8,814,089 | B2 * | 8/2014 | Chandler | B64D 11/0023 | 244/118.5 |
| 8,869,865 | B2 * | 10/2014 | Roach | B64D 11/0023 | 160/84.04 |
| 8,960,602 | B2 * | 2/2015 | Neumann | B64D 11/0023 | 244/129.4 |
| 9,027,880 | B2 * | 5/2015 | Breuer | B64D 11/0023 | 244/121 |
| 9,108,717 | B2 * | 8/2015 | Boyer, Jr. | B64C 1/1415 | |
| 9,139,301 | B2 * | 9/2015 | Slyter | B64D 11/0023 | |
| 9,463,877 | B2 * | 10/2016 | Ulbrich-Gasparevic | B64D 11/0023 | |
| 9,556,667 | B2 * | 1/2017 | Clos | B64D 11/0023 | |
| 9,856,695 | B2 * | 1/2018 | Leadens, II | B64D 11/0023 | |
| 10,231,563 | B2 * | 3/2019 | Colacecchi | A47H 1/04 | |
| 10,307,007 | B2 * | 6/2019 | Thomas | A47K 3/38 | |
| 10,562,630 | B2 * | 2/2020 | Reams | B64D 11/0638 | |
| 10,737,788 | B2 * | 8/2020 | Slyter | A47H 1/18 | |
| 10,793,276 | B2 * | 10/2020 | Radacovici | B64D 11/003 | |
| 10,850,844 | B2 * | 12/2020 | Corbett | B62D 25/2054 | |
| 11,279,461 | B2 * | 3/2022 | Movsesian | B64C 1/1461 | |
| 11,547,233 | B2 * | 1/2023 | Shepherd | A47H 13/04 | |
| 11,691,733 | B2 * | 7/2023 | Vermeulen | B64C 1/34 | 244/118.5 |
| 11,878,193 | B2 * | 1/2024 | Lambridis | A62C 2/247 | |
| 12,202,606 | B2 * | 1/2025 | Glain | B64D 11/003 | |
| 12,330,789 | B2 * | 6/2025 | Thornton | B64C 1/10 | |
| 2001/0033084 | A1 * | 10/2001 | Murray | B60J 1/2011 | 296/37.16 |
| 2005/0116098 | A1 * | 6/2005 | Martens | B64C 1/1469 | 244/118.5 |
| 2008/0131226 | A1 * | 6/2008 | Pesson | B60P 7/14 | 410/129 |
| 2013/0240163 | A1 * | 9/2013 | Mosler | B64D 11/00 | 160/368.1 |
| 2019/0248498 | A1 * | 8/2019 | Kimizuka | B64D 11/0602 | |
| 2022/0119089 | A1 * | 4/2022 | Homewood | B64C 1/1469 | |
| 2023/0348063 | A1 * | 11/2023 | Mansouri | B64D 11/0023 | |
| 2024/0090695 | A1 * | 3/2024 | Hall | A47H 5/02 | |
| 2024/0199208 | A1 * | 6/2024 | Kallergis | B64D 9/00 | |
| 2025/0042573 | A1 * | 2/2025 | Diaz | B64D 11/0023 | |

* cited by examiner

BARRIER SYSTEM AND METHOD FOR A CARGO COMPARTMENT OF AN AIRCRAFT

CROSS-REFERENCE TO RELATED APPLICATIONS

This application is a non-provisional conversion of, and claims priority to, U.S. Provisional Patent Application No. 63/517,406, filed Aug. 3, 2023, which is incorporated by reference in its entirety.

FIELD OF THE DISCLOSURE

Examples of the present disclosure generally relate to a barrier system and method for a cargo compartment of an aircraft.

BACKGROUND OF THE DISCLOSURE

Vehicles such as commercial aircraft are used to transport passengers and/or cargo between various locations. A typical aircraft includes an internal cabin having seats for passengers. As another example, a freighter aircraft includes a main deck compartment. That is, a freighter aircraft can include an internal cabin dedicated to transporting cargo instead of passengers.

A barrier can be used to separate a main deck cargo compartment from one or more areas, such as a passenger seating area. Known barriers are either permanent structures, or require a relatively long duration to remove and install. Barriers are typically configured to prevent passage of smoke therethrough. As such, a typical barrier provides a wall-to-wall, ceiling-to-floor sealed interface.

SUMMARY OF THE DISCLOSURE

A need exists for a barrier for an internal cabin of an aircraft that can be quickly and efficiently moved between a closed position and an open position.

With that need in mind, certain examples of the present disclosure provide a vehicle (such as an aircraft) including an internal cabin having a main deck cargo compartment, and a barrier system within the internal cabin. The barrier system includes one or more flexible drapes moveable between an open position and a closed position.

In at least one example, the flexible drapes are configured to be selectively moved between the open position and the closed position to selectively open and close the main deck cargo compartment from one more other areas of the internal cabin. As another example, the flexible drapes are configured to be selectively moved between the open position and the closed position to selectively open and close the main deck cargo compartment into separate areas.

In at least one example, the one or more flexible drapes comprise two or more flexible drapes. As a further example, the barrier system also includes an openable interface configured to selectively couple and uncouple the two or more flexible drapes.

The one or more flexible drapes can include one or more ropes configured to secure the one or more drapes in the open position.

The one or more flexible drapes can include a weighted roller bar at a bottom end.

The one or more flexible drapes can include one or more coupling interfaces at a bottom end. The one or more coupling interfaces are configured to removably couple to one or more reciprocal interfaces on a floor of the internal cabin.

The one or more flexible drapes can include a recessed opening configured to fit over a cargo handling track system when the one or more flexible drapes are in the closed position.

Certain examples of the present disclosure provide a method including moving the flexible drapes between the open position and the closed position. In at least one example, said moving includes selectively opening and closing the main deck cargo compartment in relation to one more other areas of the internal cabin. In at least one example, said moving includes selectively opening and closing the main deck cargo compartment in relation to separate areas.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word “a” or “an” should be understood as not necessarily excluding the plural of the elements or steps. Further, references to “one embodiment” are not intended to be interpreted as excluding the existence of additional embodiments that also incorporate the recited features. Moreover, unless explicitly stated to the contrary, embodiments “comprising” or “having” an element or a plurality of elements having a particular condition can include additional elements not having that condition.

As described herein, examples of the present disclosure provide a vehicle including an internal cabin having a main deck cargo compartment, and a barrier system within the internal cabin. The barrier system is configured to selectively open and close the main deck cargo compartment from one more other areas of the internal cabin, and/or selectively open and close the main deck cargo compartment into separate areas.

In at least one example, the barrier system includes one or more flexible drapes configured to be selectively moved between a deployed position and a stowed position. The one or more flexible drapes can include two or more flexible drapes. An openable interface can be configured to selectively couple and uncouple the two or more flexible drapes.

The one or more drapes can include one or more ropes configured to secure the one or more drapes in the stowed position. The one or more drapes can include a weighted roller bar at a bottom end.

Figure 1:
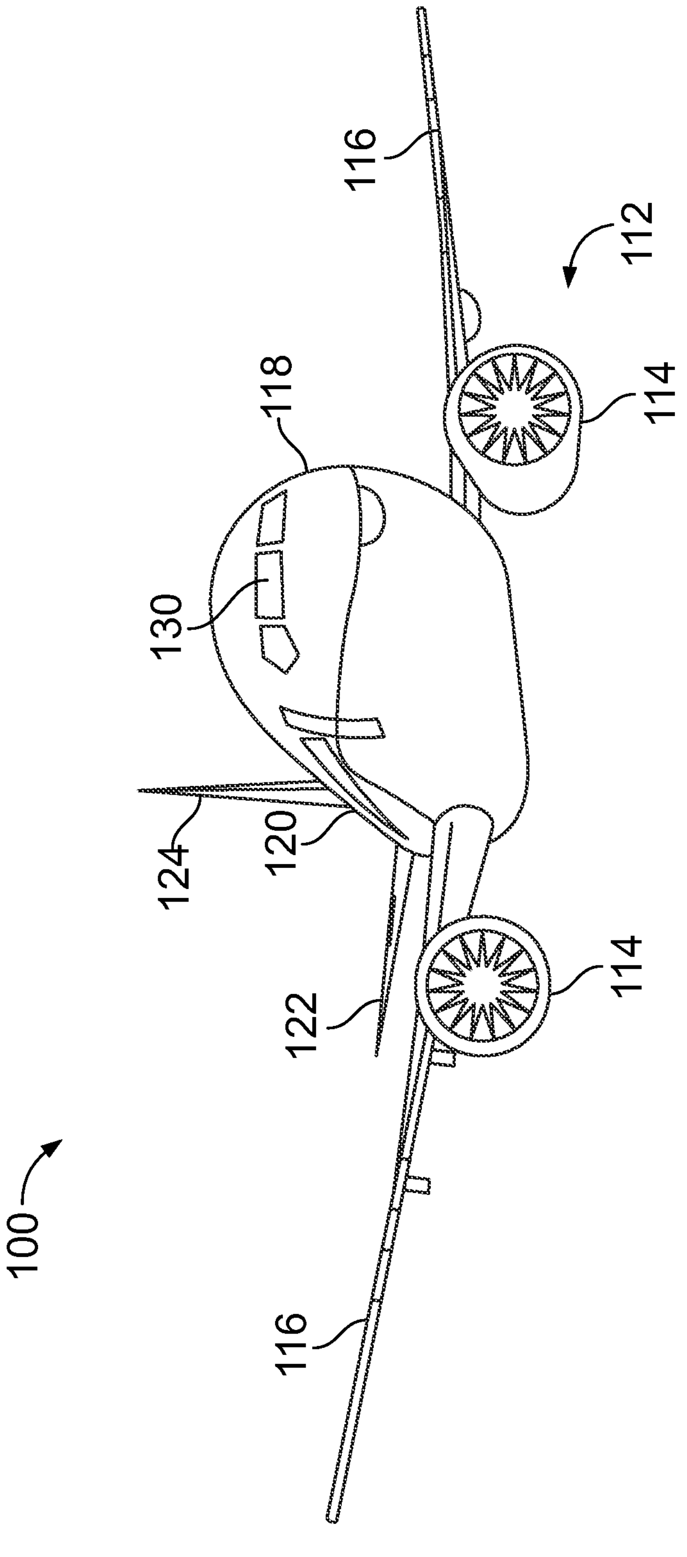
FIG. 1 illustrates a perspective front view of an aircraft, according to an example of the present disclosure.

FIG. 1 illustrates a perspective front view of an aircraft 100, according to an example of the present disclosure. The aircraft 100 includes a propulsion system 112 that includes engines 114, for example. Optionally, the propulsion system 112 may include more engines 114 than shown. The engines 114 are carried by wings 116 of the aircraft 100. In other examples, the engines 114 may be carried by a fuselage 118 and/or an empennage 120. The empennage 120 may also support horizontal stabilizers 122 and a vertical stabilizer 124.

The fuselage 118 of the aircraft 100 defines an internal cabin 130. The internal cabin 130 includes a cargo compartment. For example, the cargo compartment can be a main deck cargo compartment. The internal cabin 130 can also include a passenger seating area. A barrier system is used to separate the cargo compartment from the passenger seating area. Optionally, the internal cabin may not include a passenger seating area, and a barrier system can be used to separate different areas of the cargo compartment. As another example, the cargo compartment can be outside of the internal cabin (such as underneath a floor), and a barrier system can be used to separate different areas of the cargo compartment.

Alternatively, instead of an aircraft, examples of the present disclosure may be used with various other vehicles, such as automobiles, buses, locomotives and train cars, watercraft, and the like.

Figure 2:
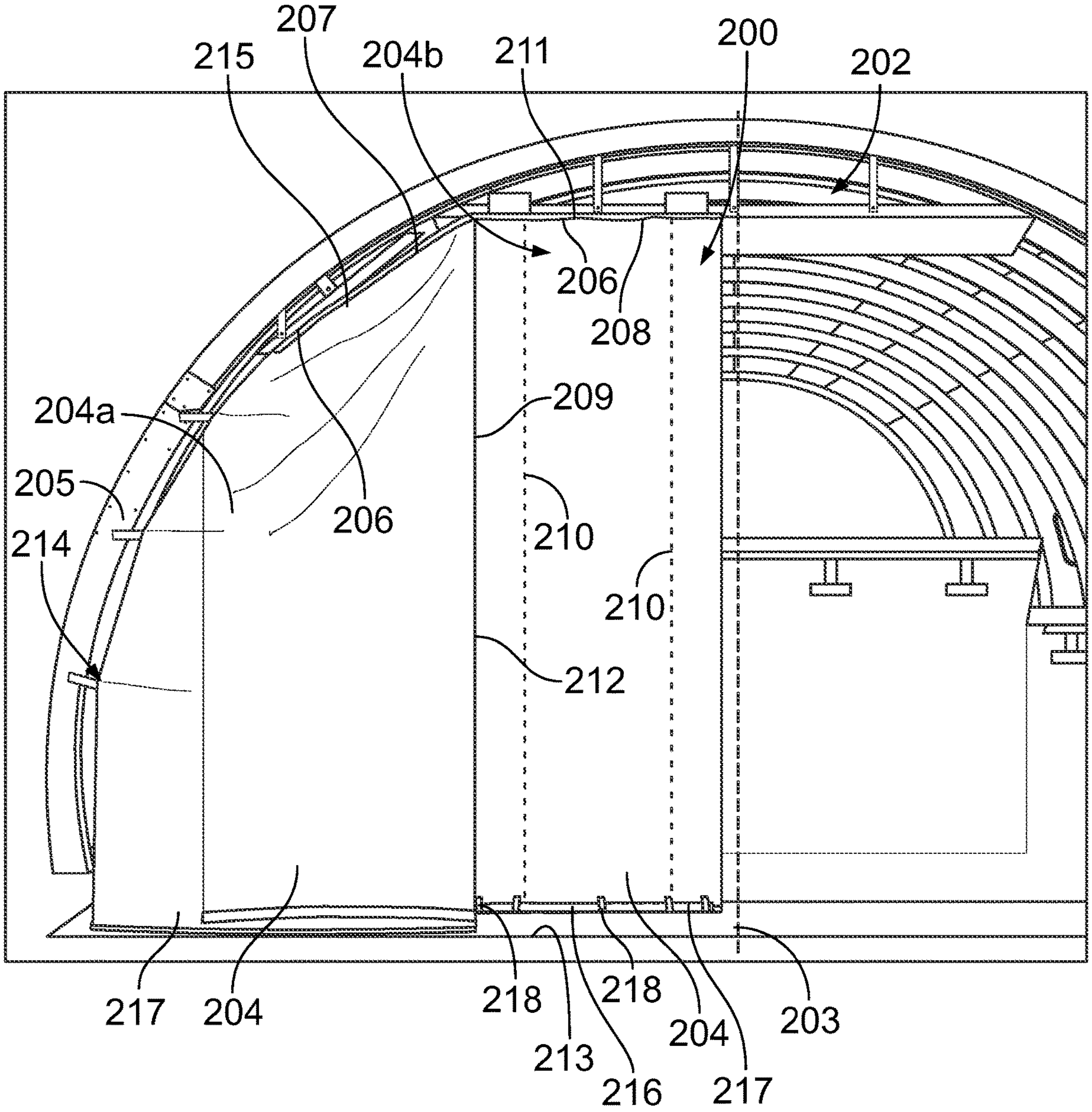
FIG. 2 illustrates a front perspective view of a barrier system having flexible drapes in a closed position within an internal cabin, according to an example of the present disclosure.

FIG. 2 illustrates a front perspective view of a barrier system 200 having flexible drapes 204 in a closed position within an internal cabin 202, according to an example of the present disclosure. FIG. 2 shows half of the barrier system 200. It is to be understood that the barrier system 200 can span across an entire width of the internal cabin 202.

As used herein, the term "outboard" means a position that is further away from a central longitudinal plane 203 of the internal cabin 202 as compared to another component. The term "inboard" means a position that is closer to the central longitudinal plane 203 of the internal cabin 202 as compared to another component.

The barrier system 200 includes one or more flexible drapes 204. The drapes 204 can be formed of a flexible plastic, for example. In at least one example, the drapes 204 can include a fire-retardant material. In at least one example, the drapes 204 can include an intumescent material. The drapes 204 can be opaque. In at least one other example, the drapes 204 can be translucent. As another example, the drapes 204 can include both opaque portions and translucent portions.

The drapes 204 are configured to be moved between a deployed position coinciding with the closed position, and a stowed position coinciding with an open position. The drapes 204 includes upper ends 206 that are secured to fixed structures within the internal cabin 202. For example, the upper ends 206 are secured to sidewalls and/or a ceiling through couplings, such as fasteners, brackets, rails, and/or the like. The drapes 204 can include ropes 210 that can be used to retain the drapes 204 in rolled-up, open positions. An openable interface 212 can couple adjacent drapes 204 together. For example, the interface 212 can include a zipper. Each section can include a zipper member, together which provide the openable interface 212. The interface 212 is configured to selectively couple and uncouple the drapes 204*a* and 204*b* from one another. An outboard section 214 of a drape 204 can provide space for passage along sidewalls while the barrier system 200 is in the closed position.

As shown, the drapes 204 can include a first drape 204*a* (such as an outboard drape) and a second drape 204*b* (such as an inboard drape). The first drape 204*a* can be sized and shaped to conform to interior surfaces of the outboard sidewall 205 and outboard ceiling portion 207. The second drape 204*b* can be sized and shaped to conform to an inboard edge 209 of the first drape 204*a*, and an inboard ceiling portion 211. The first drape 204*a* and the second drape 204*b* extend across half an axial cross-section of the internal cabin 202, between the outboard sidewall 205 and the central longitudinal plane 203. Accordingly, four drapes 204 can extend across an entire axial cross-section of the internal cabin 202. In at least one other example, a single drape 204 can extend across half an axial cross-section of the internal cabin 202 (such that two drapes 204 extend across the entire cross-section of the internal cabin 202. In at least one other example, a single drape 204 can extend across an entire axial cross-section of the internal cabin 202. As another example, three drapes 204 can extend across the entire axial cross-section of the internal cabin 202.

In the closed position, the drapes 204 are unrolled to provide substantially flat barrier sheets. In the closed position, the drapes 204 extend from and between a floor 213 and a ceiling 215. The drapes 204 in the closed position may not fully contact the floor 213 or the ceiling 215 in the closed position. Optionally, the drapes 204 in the closed position may directly contact both the floor 213 and the ceiling 215.

In at least one example, a weighted roller bar 216 is disposed at a bottom end 217 of the drape(s) 204. The roller bar 216 is configured to allow the drape(s) 204 to be upwardly rolled into the open position.

Further, one or more coupling interfaces 218 can be disposed at the bottom end 217 of the drape(s) 204. The coupling interfaces 218 are configured to removably couple to reciprocal interfaces on a floor. For example, the coupling interfaces 218 can be or include hook and loop fasteners. As another example, the coupling interfaces 218 can include latches, snaps, and/or the like. Optionally, the drape(s) 204 may not include a coupling interface at a bottom end.

Figure 3:
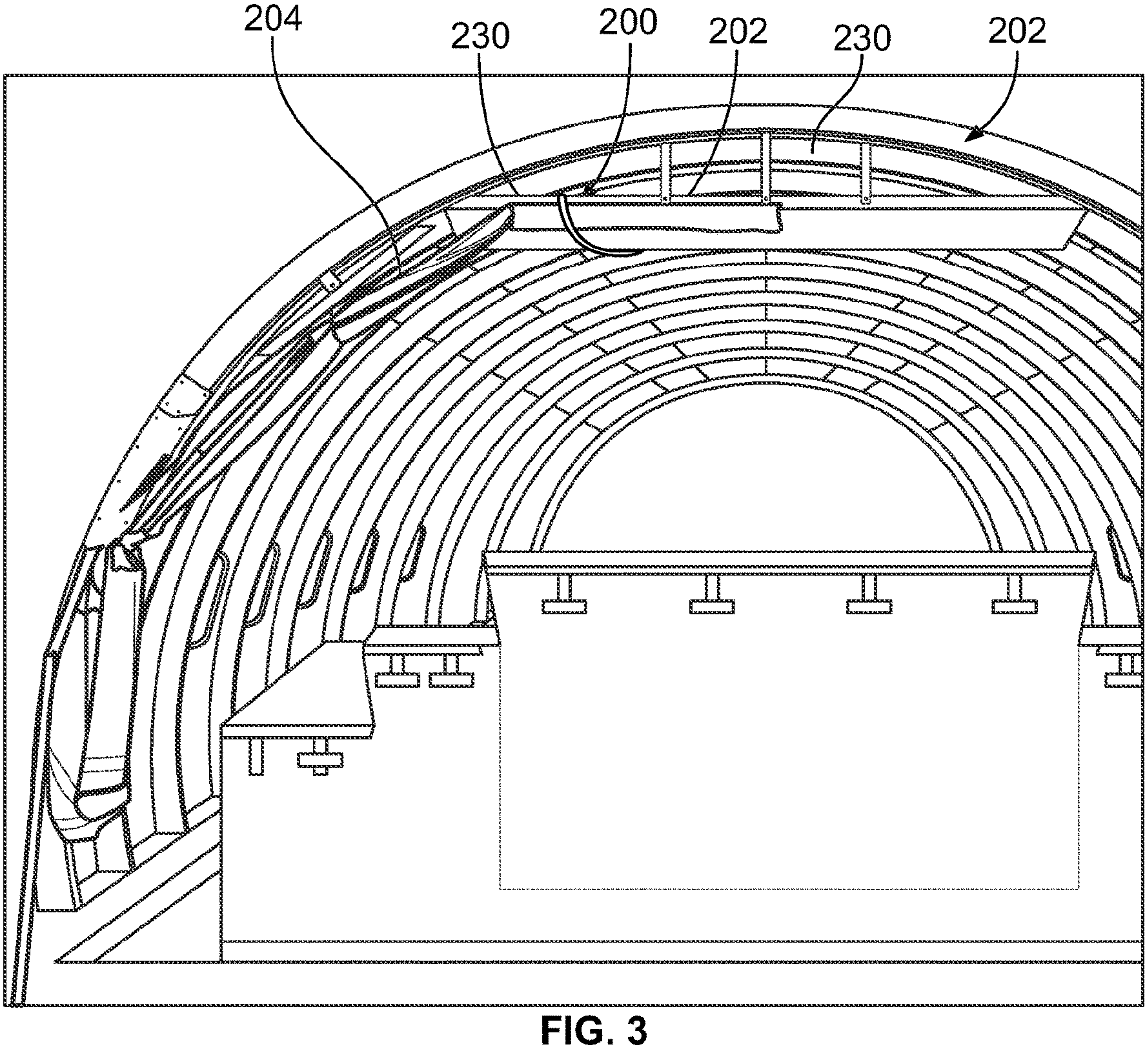
FIG. 3 illustrate a front perspective view of the barrier system having the flexible drapes in an open position within the internal cabin.

FIG. 3 illustrate a front perspective view of the barrier system 200 having the flexible drapes 204 in an open position within the internal cabin 202. Couplers 230, such as hooks, rings, or the like, can be used to securely suspend the drape(s) 204 in the open position. Ropes can be secured by cleat(s). A lanyard and snap can be used to secure the barrier system 200 in the open position.

Figure 4:
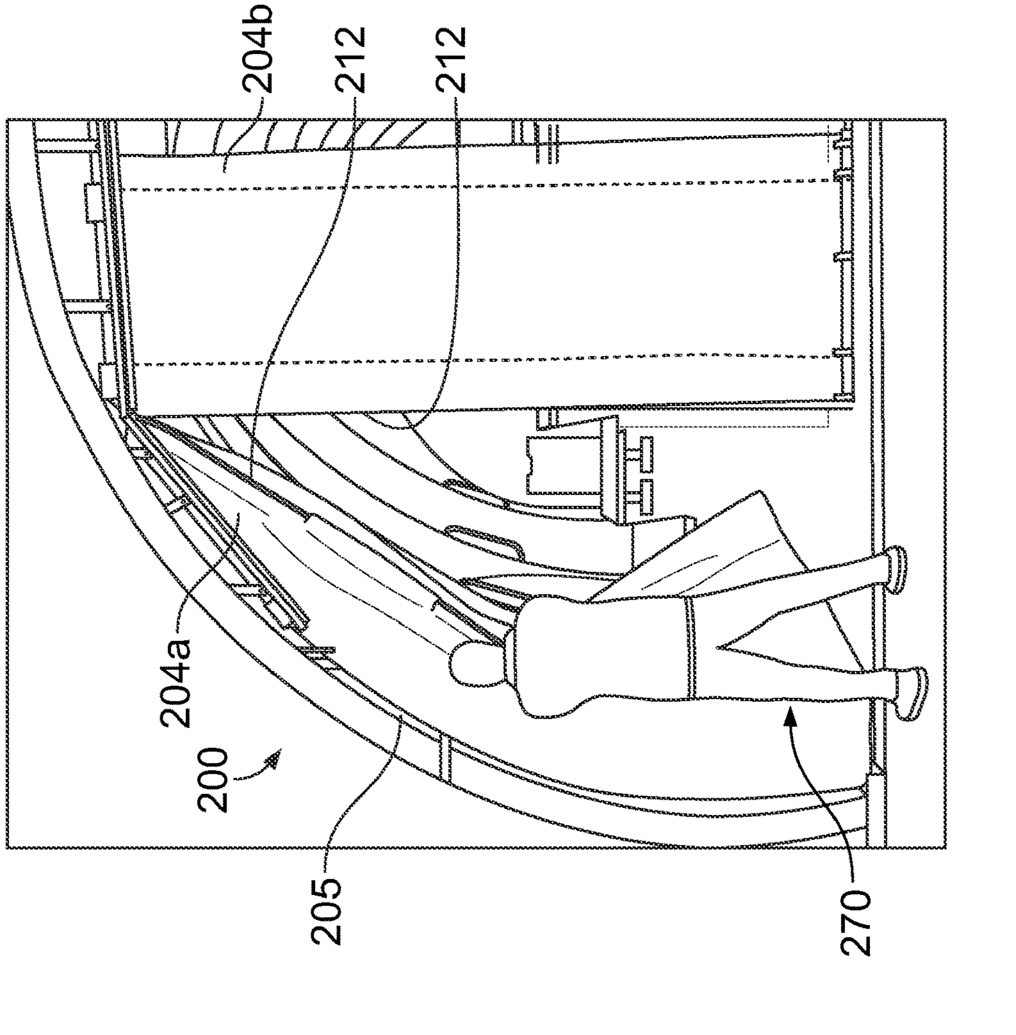
FIG. 4 illustrates a front perspective view of the barrier system having a drape moved toward an open position, according to an example of the present disclosure.

FIG. 4 illustrates a front perspective view of the barrier system 200 having a drape 204*a* moved toward an open position, according to an example of the present disclosure. In order to move the drape 204*a* into the open position, an individual 270 first disengages the interface 212 between the drape 204*a* and the drape 204*b*. For example, the interface 212 can be a zipper. As such, the individual 270 unzippers the drape 204*a* from the drape 204*b*. After the drape 204*a* is uncoupled from the drape 204*b*, the individual 270 manually pulls the drape 204*a* toward the outboard sidewall 205.

Figure 5:
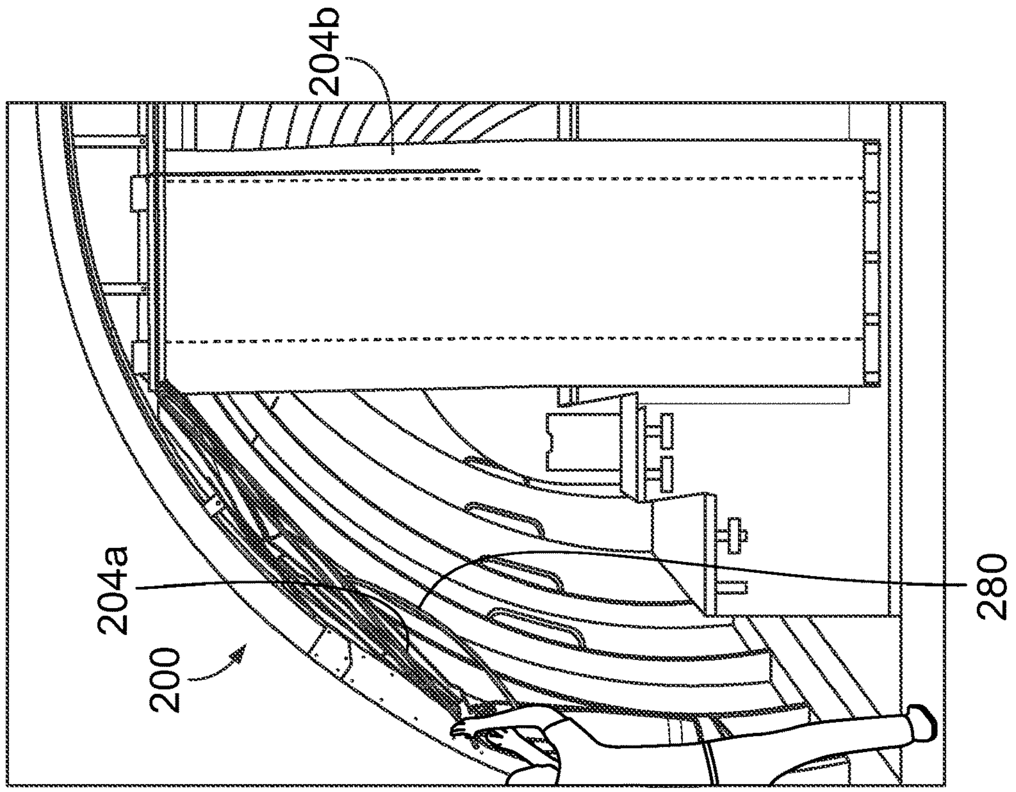
FIG. 5 illustrates a front perspective view of the barrier system having the drape in the open position.

FIG. 5 illustrates a front perspective view of the barrier system 200 having the drape secured in the open position. After the drape 204*a* is pulled on or proximate to the outboard sidewall 205, securing members 280, such as one or more lanyards, can be used to suspend the drape 204*a* in the open position. Other examples of securing members 280 include buttons, hooks, hook and loop fasteners, or the like.

Figure 6:
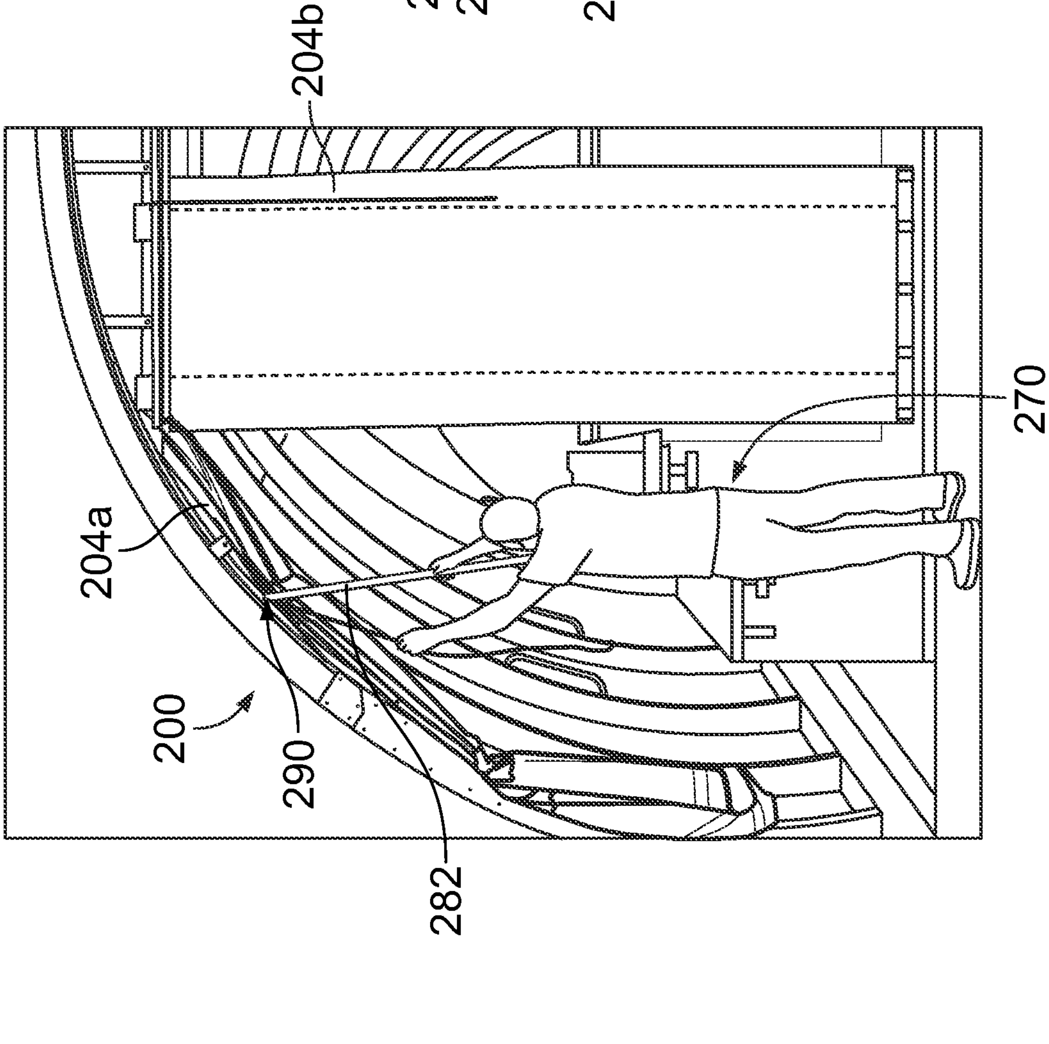
FIG. 6 illustrates a front perspective view of the barrier system with the drape being secured in the open position.

FIG. 6 illustrates a front perspective view of the barrier system 200 with the drape 204*a* being secured in the open position. The individual 270 can use a tool 282, such as a rod, stick, or the like having an engagement portion (such as a hook) to attach rope 290 to hook the drape 204*a* on a slope section of the ceiling.

Figure 7:
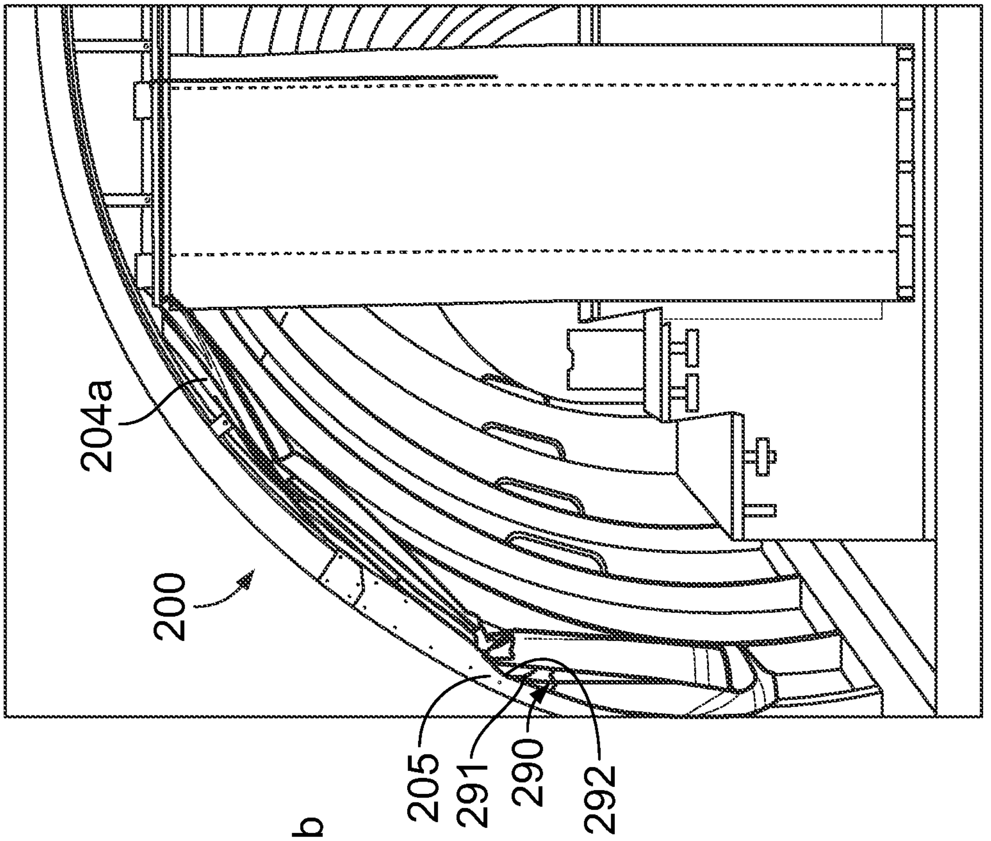
FIG. 7 illustrates a front perspective view of the barrier system with the drape firmly secured in the open position.

FIG. 7 illustrates a front perspective of the barrier system 200 with the drape 204*a* firmly secured in the open position. The rope 290 can then be pulled to tighten the drape 204*a* against the ceiling. An end 292 of the rope 290 can then be tied to a cleat 291 on the sidewall 205 to maintain the drape 204*a* in the open position.

Figure 9:
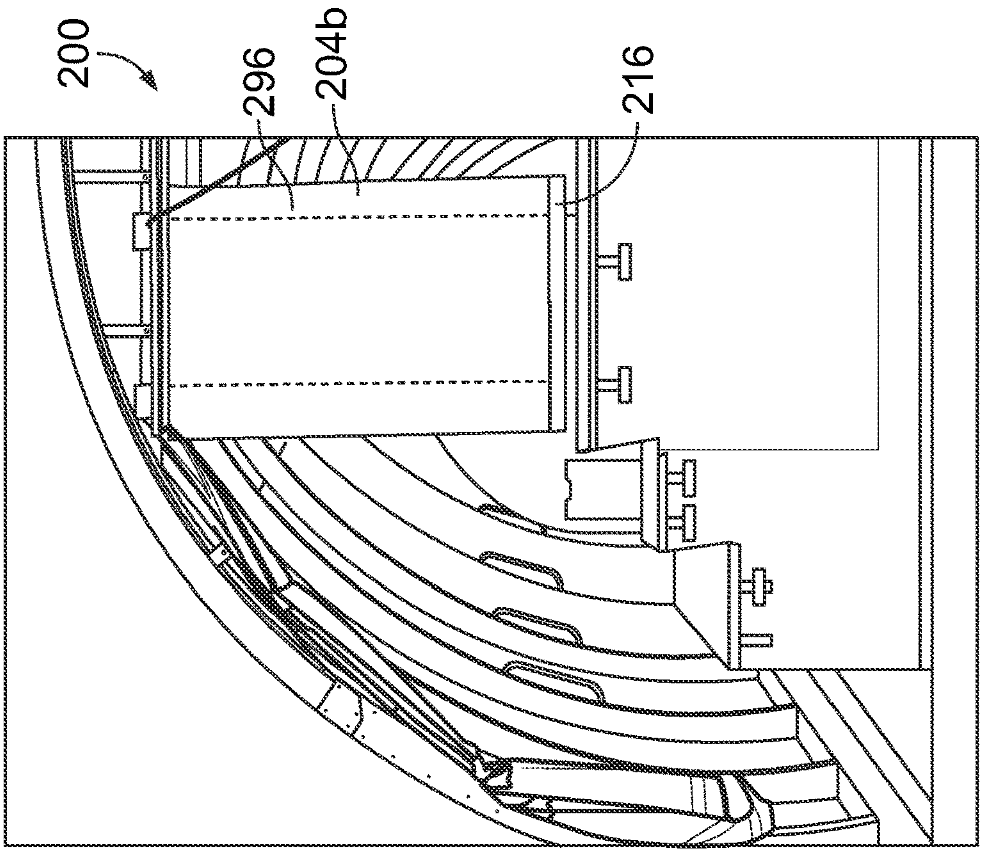
FIG. 9 illustrates a front perspective view of the barrier system with the drape between a fully open position and a fully closed position.
Figure 8:
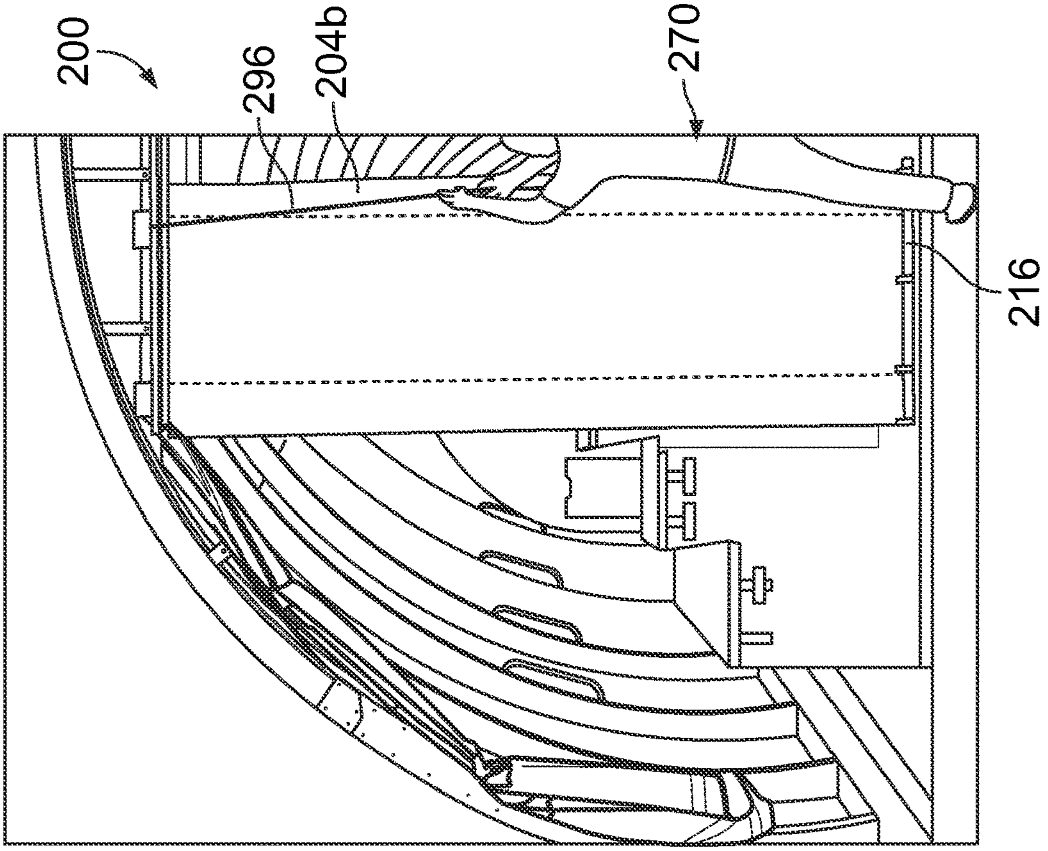
FIG. 8 illustrates a front perspective view of the barrier system with a drape being moved toward an open position.

FIG. 8 illustrates a front perspective view of the barrier system 200 with the drape 204*b* being moved toward an open position. FIG. 9 illustrates a front perspective view of the barrier system 200 with the drape 204*b* between a fully open position and a fully closed position. As shown in FIGS. 8 and 9, the individual pulls on a rope 296 coupled to the drape 204*b* to upwardly move the drape 204*b* toward the ceiling. As the drape 204*b* moves upwardly, the drape 204*b* can roll around the roller bar 216.

Figure 10:
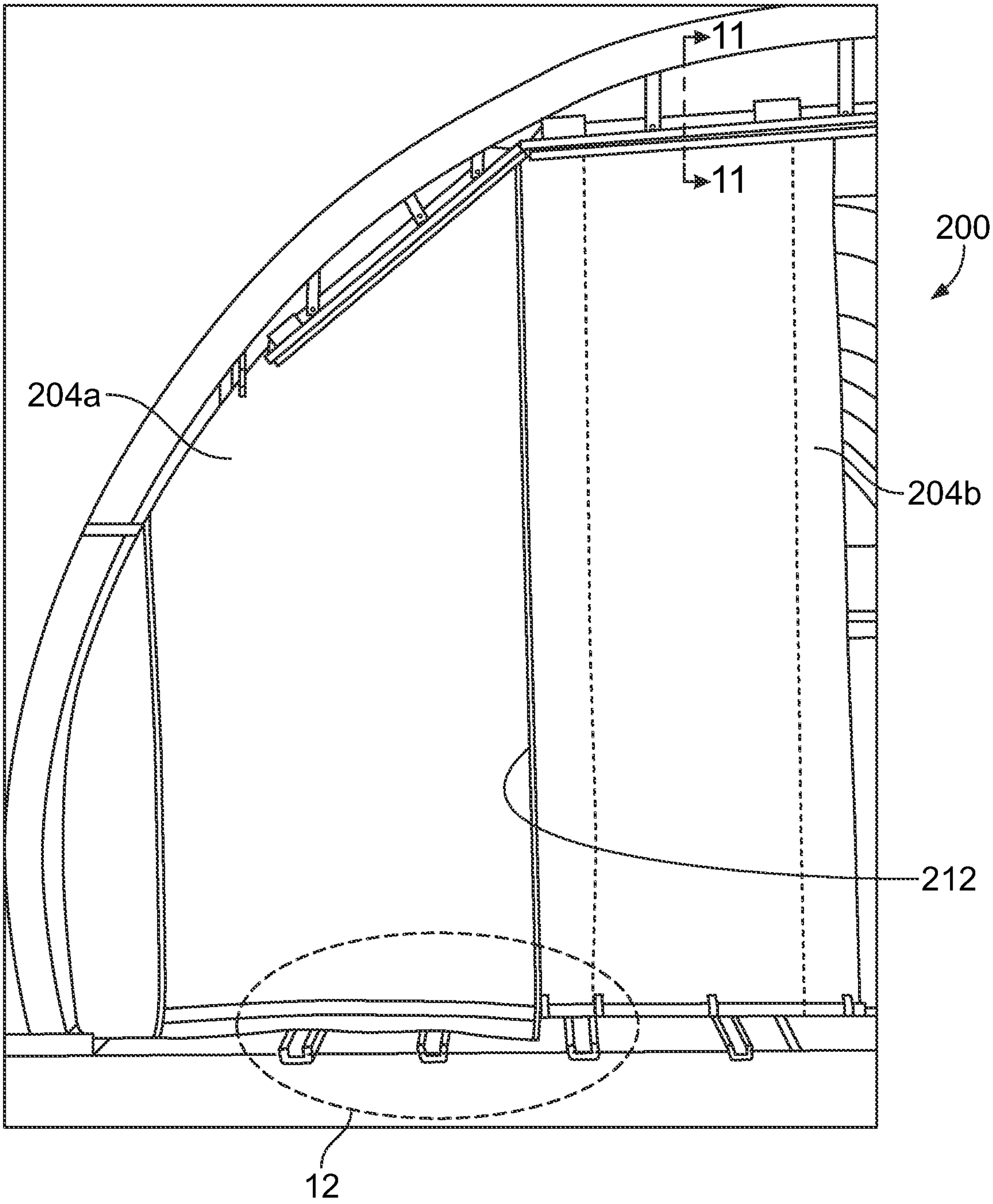
FIG. 10 illustrates a front perspective view of a barrier system having drapes in a closed position, according to an example of the present disclosure.
Figure 11:
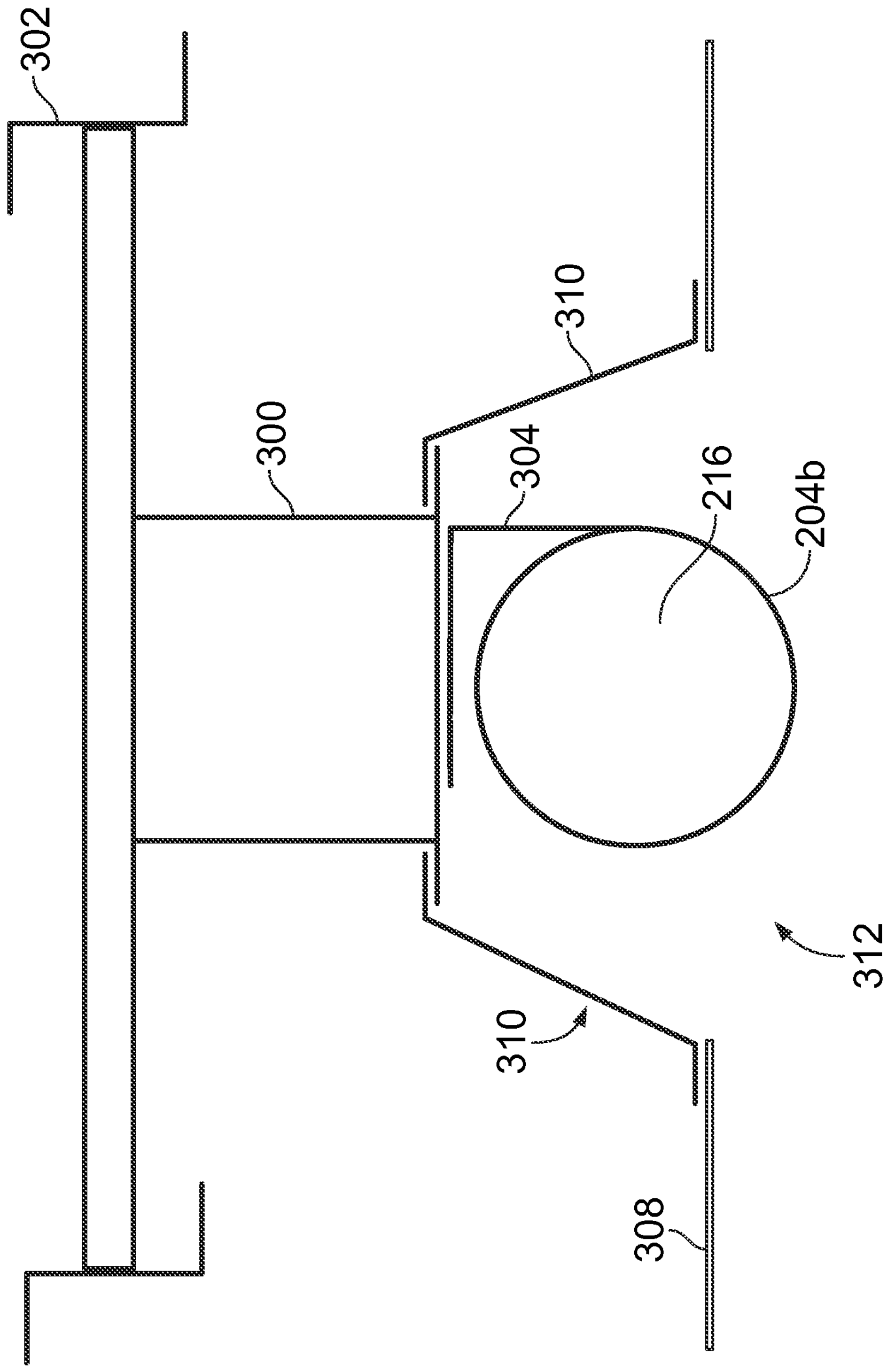
FIG. 11 illustrates a cross-sectional view of a cross-sectional view of a drape through line 11-11 of FIG. 10.

FIG. 10 illustrates a front perspective view of the barrier system 200 having drapes 204*a* and 204*b* in a closed position, according to an example of the present disclosure. FIG. 11 illustrates a cross-sectional view of a cross-sectional view of a drape 204*b* through line 11-11 of FIG. 10. Referring to FIGS. 10 and 11, the drape 204*b* in FIG. 11 is shown in a rolled-up, open position. The drape 204*b* is rolled around the roller bar 216. The drape 204*b* can be secured to a beam 300 extending downwardly from an upper frame 302 by a securing bracket 304. The securing bracket 304 is recessed above a ceiling 308 by closeouts 310. In this manner, the securing bracket 304 suspends the drape 204*b* in the closed position within a channel 312 formed in the ceiling 308.

Figure 12:
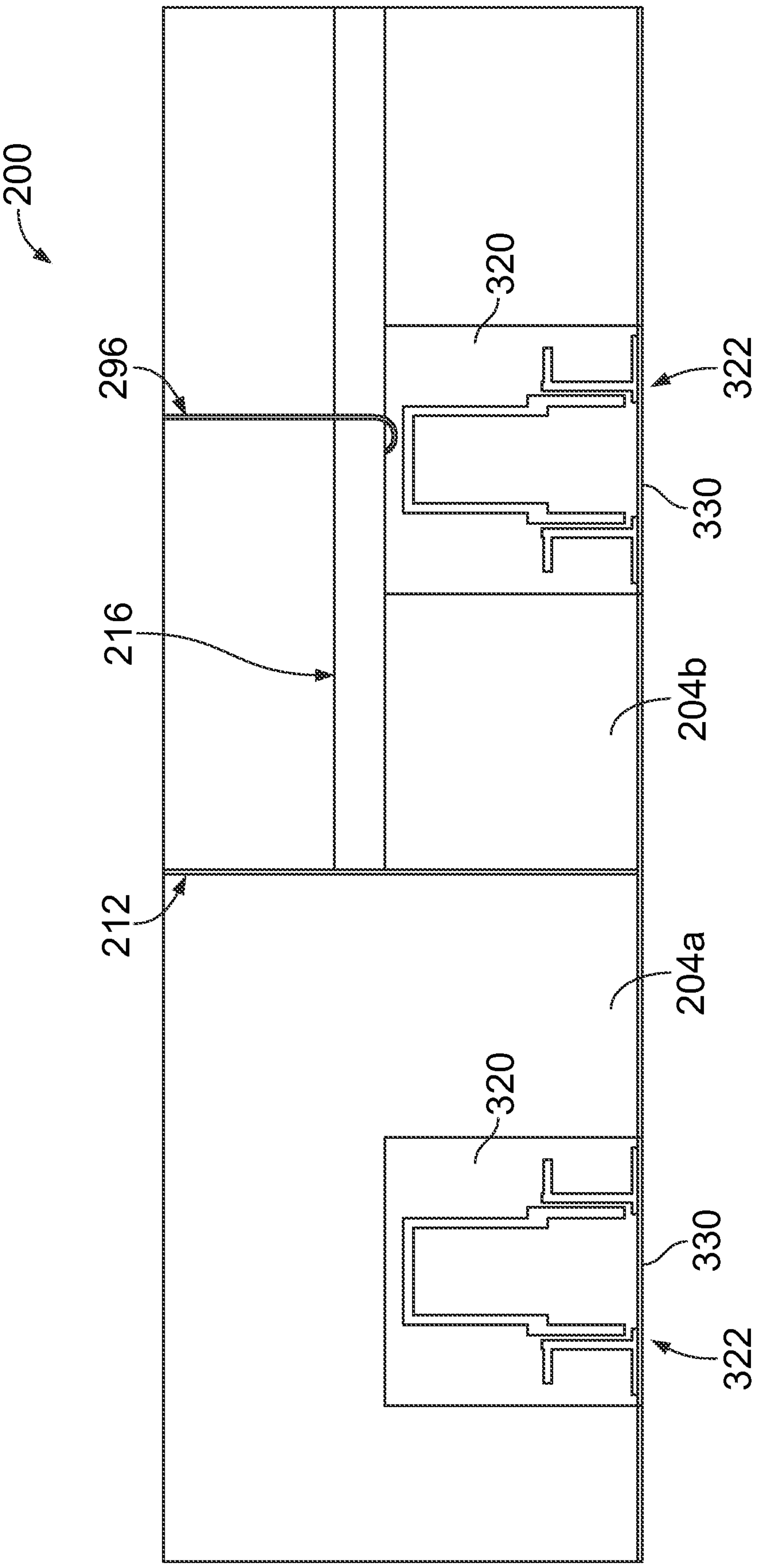
FIG. 12 illustrates a close-up view of the barrier system within section 12 of FIG. 10.

FIG. 12 illustrates a close-up view of the barrier system 200 within section 12 of FIG. 10. As shown, each drape 204*a* and 204*b* can include a recessed opening 320, which fits over a cargo handling track system 322 extending above a floor 330 of a cargo compartment. In this manner, the cargo handling track system 322 does not prop up the drapes 204*a* and 204*b* in the closed position.

As shown, the rope 296 is coupled to the roller bar 216. As such, when the rope 296 is pulled, the roller bar 216 rolls upwardly, and the drape 204*b* rolls around the roller bar 216.

Figure 13:
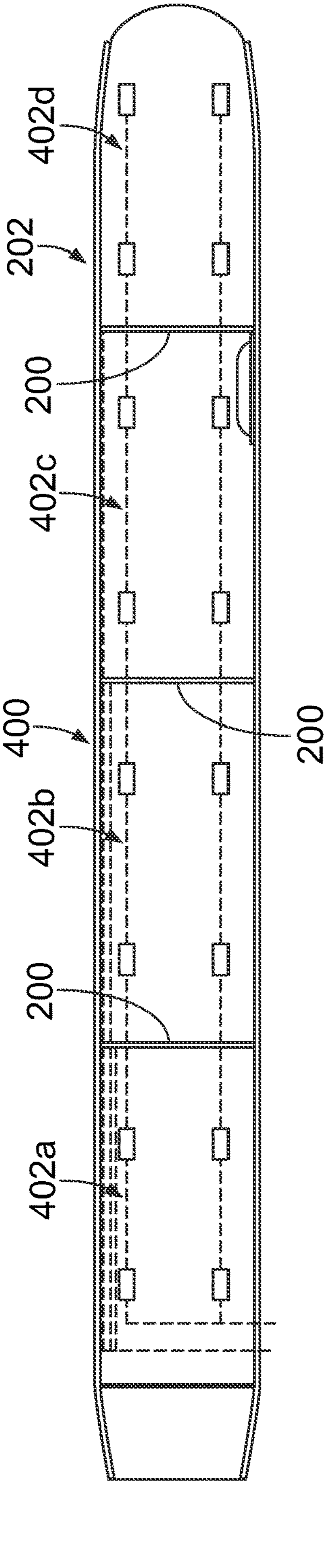
FIG. 13 illustrates a top plan view of a main deck cargo compartment of an aircraft, according to an example of the present disclosure.

FIG. 13 illustrates a top plan view of a main deck cargo compartment 400 of an aircraft, according to an example of the present disclosure. Barrier systems 200 are disposed within the main deck cargo compartment 400. Fewer or more barrier systems 200 than shown can be used.

Referring to FIGS. 1-13, cargo compartment airflow shutdown and aircraft depressurization is a known method of suppressing a cargo fire within a main deck of a transport category freighter-only aircraft. Implementation of a cargo fire suppression system in the main deck cargo compartment similar to an existing gaseous suppression system available in the lower cargo compartments improves protection against main deck cargo fires. However, use of a gaseous fire suppression system in the main deck cargo compartment can be impractical due to the large quantity of suppression agent that would be required as a result of the large volume and air exchange rate of the compartment.

Accordingly, the barrier systems 200 are used to segment the volume of the main deck cargo compartment 400 into separate smaller areas 402*a*, 402*b*, 402*c*, and 402*d*, thereby greatly reducing the quantity of suppression agent required, and allow for installation of a targeted main deck cargo fire suppression system using a gaseous agent. The barrier systems 200 segment the main deck cargo compartment 400 into a series of smaller areas 402*a-d* for the purpose of installing a gaseous main deck cargo fire suppression system. As shown and described, the barrier systems 200 can be selectively stowed and deployed quickly so as to not impact cargo loading/unloading operations, and fit between cargo pallet positions.

In at least one example, the drape(s) 204 of the barrier system 200 can be formed of a fabric material that meets the requirements of 14 CFR Part 25, Appendix F, Part III. A passageway between the cargo compartment sidewall and an outboard cargo loading boundary allows personnel to pass through the barrier system 200 in the deployed, closed position. A semi-permanent installation along the ceiling and sidewalls can reduce leakage through the barrier system 200. A zipper or similar interface can be used where a horizontal ceiling segment meets a sloped ceiling segment. A lanyard and snap (or similar) interface on sidewall can be used to secure outboard barrier section to sidewall (when the outboard barrier section is in the open position). A rope and hook (or similar) can be used to conform an outboard barrier section to a cargo compartment inner mold line. The rope and hook (or similar) system can also be used to raise/lower rolling center section of barrier. A cleat (or similar) can be used to secure ropes to a sidewall.

An electro-mechanical interface between the barrier system 200 and another area can be used to indicate that the barrier system 200 is fully deployed into the closed position (for example, a connector attached to zipper that plugs into port on the floor). When deployed into the closed position, the barrier system 200 can drape loosely on a floor/cargo handling system, and/or be removably secured to the floor by coupling interfaces. The barrier system 200 is configured for quick deployment into the closed position, and stowage into the open position. The barrier system 200 helps achieve the ultimate goal of protecting a main deck cargo compartment with a gaseous cargo fire suppression system similar to what is currently used in lower cargo compartments.

Optionally, the barrier system 200 can be or otherwise include one or more drapes that divide at butt-line zero (via zipper or similar), and pull to either side of the compartment. In this example, there may be no need for a roll-up configuration.

Further, the disclosure comprises examples according to the following clauses:

Clause 1. A vehicle comprising:

an internal cabin having a main deck cargo compartment; and a barrier system within the internal cabin, wherein the barrier system comprises one or more flexible drapes moveable between an open position and a closed position.

Clause 2. The vehicle of Clause 1, wherein the flexible drapes are configured to be selectively moved between the open position and the closed position to selectively open and close the main deck cargo compartment from one more other areas of the internal cabin.

Clause 3. The vehicle of Clauses 1 or 2, wherein the flexible drapes are configured to be selectively moved between the open position and the closed position to selectively open and close the main deck cargo compartment into separate areas.

Clause 4. The vehicle of any of Clauses 1-3, wherein the vehicle is an aircraft.

Clause 5. The vehicle of any of Clauses 1-4, wherein the one or more flexible drapes comprise two or more flexible drapes.

Clause 6. The vehicle of Clause 5, wherein the barrier system further comprises an openable interface configured to selectively couple and uncouple the two or more flexible drapes.

Clause 7. The vehicle of any of Clauses 1-6, wherein the one or more flexible drapes comprise one or more ropes configured to secure the one or more drapes in the open position.

Clause 8. The vehicle of any of Clauses 1-7, wherein the one or more flexible drapes comprise a weighted roller bar at a bottom end.

Clause 9. The vehicle of any of Clauses 1-8, wherein the one or more flexible drapes comprise one or more coupling interfaces at a bottom end, wherein the one or more coupling interfaces are configured to removably couple to one or more reciprocal interfaces on a floor of the internal cabin.

Clause 10. The vehicle of any of Clauses 1-9, wherein the one or more flexible drapes comprise a recessed opening configured to fit over a cargo handling track system when the one or more flexible drapes are in the closed position.

Clause 11. A method for a vehicle comprising:

an internal cabin having a main deck cargo compartment; and a barrier system within the internal cabin, wherein the barrier system comprises one or more flexible drapes moveable between an open position and a closed position, wherein the method comprises:

moving the flexible drapes between the open position and the closed position.

Clause 12. The method of Clause 11, wherein said moving comprises selectively opening and closing the main deck cargo compartment in relation to one more other areas of the internal cabin.

Clause 13. The method of Clauses 11 or 12, wherein said moving comprises selectively opening and closing the main deck cargo compartment in relation to separate areas.

Clause 14. The method of any of Clauses 11-13, wherein the one or more flexible drapes comprise two or more flexible drapes, the method further comprising engaging an openable interface to selectively couple and uncouple the two or more flexible drapes.

Clause 15. The method of any of Clauses 11-14, further comprising engaging one or more ropes configured to secure the one or more flexible drapes in the open position.

Clause 16. The method of any of Clauses 11-15, further comprising rolling the one or more flexible drapes around weighted roller bar to move the one or more flexible drapes into the closed position.

Clause 17. The method of any of Clauses 11-16, further comprising removably coupling one or more coupling interfaces of the one or more flexible drapes to one or more reciprocal interfaces on a floor of the internal cabin.

Clause 18. The method of any of Clauses 11-17, further comprising fitting a recessed opening of the one or more flexible drapes over a cargo handling track system when the one or more drapes are in the closed position.

Clause 19. A barrier system configured for an internal cabin of a vehicle, wherein the internal cabin has a main cargo deck compartment, the barrier system comprising:

one or more flexible drapes moveable between an open position and a closed position.

Clause 20. The barrier of Clause 19, wherein the one or more flexible drapes comprise two or more flexible drapes, wherein the barrier system further comprises:

an openable interface configured to selectively couple and uncouple the two or more flexible drapes;

one or more ropes configured to secure one or more of the two or more flexible drapes in the open position;

a weighted roller bar at a bottom end of one or more of the two or more flexible drapes; and one or more coupling interfaces at a bottom end of one of more of the two or more flexible drapes, wherein the one or more coupling interfaces are configured to removably couple to one or more reciprocal interfaces on a floor of the internal cabin.

As described herein, examples of the present disclosure provide a barrier system for an internal cabin of an aircraft that can be quickly and efficiently moved between a closed position and an open position.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second,"

and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aircraft comprising:

an internal cabin having a main deck cargo compartment; and a barrier system within the main deck cargo compartment of the internal cabin, wherein the barrier system comprises one or more flexible drapes moveable between an open position and a closed position, wherein the one or more flexible drapes are configured to be selectively moved between the open position and the closed position to selectively open and close the main deck cargo compartment into separate areas, wherein the one or more flexible drapes are secured to one or more beams extending downwardly from an upper frame by a securing bracket, wherein the securing bracket is recessed above a ceiling by one or more closeouts, and wherein the one or more flexible drapes include one or more recessed openings which fit over a cargo handling track system extending above a floor of the main deck cargo compartment when the one or more flexible drapes are in the closed position.

2. The aircraft of claim 1, wherein the one or more flexible drapes are further configured to be selectively moved between the open position and the closed position to selectively open and close the main deck cargo compartment from one more other areas of the internal cabin.

3. The aircraft of claim 1, wherein the one or more flexible drapes comprise two or more flexible drapes.

4. The aircraft of claim 3, wherein the barrier system further comprises an openable interface configured to selectively couple and uncouple the two or more flexible drapes.

5. The aircraft of claim 1, wherein the one or more flexible drapes comprise one or more ropes configured to secure the one or more drapes in the open position.

6. The aircraft of claim 1, wherein the one or more flexible drapes comprise a weighted roller bar at a bottom end.

7. The aircraft of claim 1, wherein the one or more flexible drapes comprise one or more coupling interfaces at a bottom end, wherein the one or more coupling interfaces are configured to removably couple to one or more reciprocal interfaces on a floor of the internal cabin.

8. The aircraft of claim 1, wherein the one or more flexible drapes in the closed position span across an entire width of the main deck cargo compartment.

9. The aircraft of claim 1, wherein the one or more flexible drapes include a fire-retardant material.

10. A method for an aircraft comprising:

an internal cabin having a main deck cargo compartment; and a barrier system within the main deck cargo compartment of the internal cabin, wherein the barrier system comprises one or more flexible drapes moveable between an open position and a closed position, wherein the one or more flexible drapes are secured to one or more beams extending downwardly from an upper frame by a securing bracket, wherein the securing bracket is recessed above a ceiling by one or more closeouts, and wherein the one or more flexible drapes include one or more recessed openings which fit over a cargo handling track system extending above a floor of the main deck cargo compartment when the one or more flexible drapes are in the closed position, wherein the method comprises:

moving the one or more flexible drapes between the open position and the closed position, wherein said moving comprises selectively opening and closing the main deck cargo compartment in relation to separate areas.

11. The method of claim 10, wherein said moving further comprises selectively opening and closing the main deck cargo compartment in relation to one more other areas of the internal cabin.

12. The method of claim 10, wherein the one or more flexible drapes comprise two or more flexible drapes, the method further comprising engaging an openable interface to selectively couple and uncouple the two or more flexible drapes.

13. The method of claim 10, further comprising engaging one or more ropes configured to secure the one or more flexible drapes in the open position.

14. The method of claim 10, further comprising rolling the one or more flexible drapes around a weighted roller bar to move the one or more flexible drapes into the closed position.

15. The method of claim 10, further comprising removably coupling one or more coupling interfaces of the one or more flexible drapes to one or more reciprocal interfaces on a floor of the internal cabin.

16. The method of claim 10, wherein the one or more flexible drapes in the closed position span across an entire width of the main deck cargo compartment.

17. The method of claim 10, wherein the one or more flexible drapes include a fire-retardant material.

18. An aircraft comprising:

a barrier system within a main deck cargo compartment of an internal cabin, the barrier system comprising:

one or more flexible drapes moveable between an open position and a closed position, wherein the one or more flexible drapes include a fire-retardant material, and wherein the one or more flexible drapes in the closed position span across an entire width of the main deck cargo compartment, wherein the one or more flexible drapes are secured to one or more beams extending downwardly from an upper frame by a securing bracket, wherein the securing bracket is recessed above a ceiling by one or more closeouts, and wherein the one or more flexible drapes include one or more recessed openings which fit over a cargo handling track system extending above a floor of the main deck cargo compartment when the one or more flexible drapes are in the closed position.

19. The aircraft of claim 18, wherein the one or more flexible drapes comprise two or more flexible drapes, wherein the barrier system further comprises:

an openable interface configured to selectively couple and uncouple the two or more flexible drapes;

one or more ropes configured to secure one or more of the two or more flexible drapes in the open position;

a weighted roller bar at a bottom end of one or more of the two or more flexible drapes; and one or more coupling interfaces at a bottom end of one of more of the two or more flexible drapes, wherein the one or more coupling interfaces are configured to removably couple to one or more reciprocal interfaces on a floor of the internal cabin.

20. The aircraft of claim 18, wherein the one or more flexible drapes are further configured to be selectively moved between the open position and the closed position to selectively open and close the main deck cargo compartment from one more other areas of the internal cabin.

* * * * *